(12) United States Patent
Kim et al.

(10) Patent No.: US 10,848,755 B2
(45) Date of Patent: Nov. 24, 2020

(54) PREDICTIVE DIAGNOSTIC DEVICE AND MONITORING SYSTEM

(71) Applicant: HANWHA TECHWIN CO., LTD., Seongnam-si (KR)

(72) Inventors: Dae Bong Kim, Seongnam-si (KR); Han Sang Kim, Seongnam-si (KR); Ho Woong Lee, Seongnam-si (KR); Dong Seong Kim, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 16/349,354

(22) PCT Filed: Feb. 17, 2017

(86) PCT No.: PCT/KR2017/001749
§ 371 (c)(1),
(2) Date: May 13, 2019

(87) PCT Pub. No.: WO2018/124382
PCT Pub. Date: Jul. 5, 2018

(65) Prior Publication Data
US 2019/0373250 A1    Dec. 5, 2019

(30) Foreign Application Priority Data

Dec. 27, 2016  (KR) .................. 10-2016-0180143

(51) Int. Cl.
*H04N 17/00* (2006.01)
*H04N 5/232* (2006.01)
*H04N 7/18* (2006.01)

(52) U.S. Cl.
CPC ....... *H04N 17/002* (2013.01); *H04N 5/23203* (2013.01); *H04N 5/23296* (2013.01); *H04N 5/23299* (2018.08); *H04N 7/181* (2013.01)

(58) Field of Classification Search
CPC ...... H04N 17/002; H04N 5/238; H04N 7/181; H04N 5/23222; H04N 5/23296;
(Continued)

(56) References Cited

U.S. PATENT DOCUMENTS 6,546,500 B1   4/2003  Miyamoto
6,628,323 B1   9/2003  Wegmann
(Continued)

FOREIGN PATENT DOCUMENTS

JP    11-341479 A    12/1999
JP    2001-211466 A   8/2001
(Continued)

OTHER PUBLICATIONS

International Search Report dated Aug. 18, 2017 issued by the International Searching Authority in counterpart International Application No. PCT/KR2017/001749 (PCT/ISA/210).
(Continued)

*Primary Examiner* — An T Nguyen
(74) *Attorney, Agent, or Firm* — Sughrue Mion, PLLC

(57) ABSTRACT

A monitoring system according to the present embodiment comprises a surveillance camera and a monitoring device. The surveillance camera transmits information on an operation environment thereof to the monitoring device. The monitoring device periodically predicts a future breakdown date of at least one component according to the information on the operation environment of the surveillance camera and characteristic information on the al least one component of the surveillance camera, and provides a warning when the future breakdown date of the prediction result is within a predetermined period from a current date.

14 Claims, 15 Drawing Sheets

(58) Field of Classification Search
CPC ........... H04N 5/23203; H04N 5/23299; H04N 5/44504; H04N 5/44591; G08B 21/24; G06Q 50/10; G06Q 10/06; G06Q 10/00; G06N 5/04; G06T 7/001

See application file for complete search history.

(56) References Cited

U.S. PATENT DOCUMENTS

| | | | | |
|---|---|---|---|---|
| 7,103,509 | B2* | 9/2006 | Shah | G01D 1/00 700/52 |
| 7,509,235 | B2* | 3/2009 | Bonissone | G06Q 40/06 702/181 |
| 7,725,293 | B2* | 5/2010 | Bonissone | G06N 5/04 702/183 |
| 2003/0139176 | A1* | 7/2003 | Fujiwara | H04L 67/36 455/420 |
| 2004/0105450 | A1* | 6/2004 | Ikuta | H04N 5/77 370/401 |
| 2006/0111857 | A1* | 5/2006 | Shah | G01D 1/00 702/85 |
| 2007/0039030 | A1* | 2/2007 | Romanowich | H04N 5/247 725/105 |
| 2007/0061232 | A1* | 3/2007 | Bonissone | G06Q 40/06 705/36 R |
| 2009/0143913 | A1* | 6/2009 | Kim | B25J 9/1674 700/259 |
| 2009/0322853 | A1 | 12/2009 | Katz | |
| 2012/0026326 | A1* | 2/2012 | Itoh | H04N 7/181 348/143 |
| 2013/0070108 | A1 | 3/2013 | Aerts et al. | |
| 2014/0266678 | A1* | 9/2014 | Shapiro | G05B 23/0232 340/514 |
| 2015/0244989 | A1* | 8/2015 | Liao | H04N 5/247 348/159 |
| 2015/0287318 | A1* | 10/2015 | Nair | G05B 19/418 340/5.52 |
| 2016/0007018 | A1* | 1/2016 | Ooi | H04N 17/002 348/187 |
| 2016/0119617 | A1* | 4/2016 | Sagar | H04N 17/002 348/187 |
| 2016/0155056 | A1* | 6/2016 | Shiozaki | G06N 20/00 706/52 |
| 2016/0215996 | A1* | 7/2016 | Blair | G08B 21/187 |
| 2016/0274558 | A1* | 9/2016 | Strohmenger | G05B 19/0428 |
| 2016/0359923 | A1* | 12/2016 | Chen | G06N 20/00 |
| 2017/0160349 | A1* | 6/2017 | Iida | G01R 31/36 |
| 2017/0195556 | A1* | 7/2017 | Emi | H04N 5/2256 |
| 2017/0359546 | A1* | 12/2017 | Ohmura | H04N 7/188 |
| 2019/0373250 | A1* | 12/2019 | Kim | G06Q 50/10 |

FOREIGN PATENT DOCUMENTS

| | | |
|---|---|---|
| JP | 2002-369224 A | 12/2002 |
| JP | 2007-124009 A | 5/2007 |
| JP | 2009-217770 A | 9/2009 |
| KR | 10-1999-0053940 A | 7/1999 |
| KR | 10-2004-0022023 A | 3/2004 |
| KR | 10-0731592 B1 | 6/2007 |
| KR | 10-2015-0061982 A | 6/2015 |
| KR | 10-1566839 B1 | 11/2015 |

OTHER PUBLICATIONS

Daho, "Comparison Article of Comparing High-end Camera CANON G7X and RX100M3", Oct. 7, 2015, 48 total pages, http://blog.naver.com/u_nagie/220501885109.

Written Opinion dated Aug. 18, 2017 issued by the International Searching Authority in counterpart International Application No. PCT/KR2017/001749 (PCT/ISA/237).

* cited by examiner

| COMPONENT NO. \ CAMERA NO. | 1 | 2 | ..... | n |
|---|---|---|---|---|
| 1 | | | | |
| 2 | | | | |
| ⋮ | | | | |
| m | | | | |

| OPERATION ENVIRONMENT \ CAMERA NO. | 1 | 2 | ..... | n |
|---|---|---|---|---|
| T | | | | |
| Rv | | | | |
| H | | | | |
| V | | | | |
| Tp | | | | |
| Tt | | | | |
| Tz | | | | |
| ⋮ | | | | |

PREDICTIVE DIAGNOSTIC DEVICE AND MONITORING SYSTEM

TECHNICAL FIELD

The present disclosure relates to monitoring systems, and more particularly, to a monitoring system including a surveillance camera and a monitoring device.

BACKGROUND ART

FIG. 1 is a diagram for explaining a breakdown management process in a typical monitoring system. The breakdown management process will now be described with reference to FIG. 1.

In operation S1, when a breakdown occurs, a security person within a surveillance area reports the breakdown to a maintenance person or an installer of an installation company.

Accordingly, in operation S2, the maintenance person or the installer of the installation company primarily visits the surveillance area.

Next, in operation S3, the maintenance person or the installer replaces a broken camera with a temporary camera and takes the broken camera to the installation company.

Next, in operation S4, the maintenance person or the installer diagnoses the breakdown state of the broken camera and finds a component that is to be replaced.

Next, in operation S5, the maintenance person or the installer requests a manufacturing company of the broken camera for a new component for replacing the component to be replaced.

Accordingly, in operation S6, a person in charge of the manufacturing company sends the new component to the maintenance person or the installer.

Next, in operation S7, the maintenance person or the installer replaces the component to be replaced with the new component.

Next, in operation S8, the maintenance person or the installer secondarily visits the surveillance area with a fixed surveillance camera.

In operation S9, the maintenance person or the installer replaces the temporary camera with the fixed surveillance camera and checks the monitoring system.

Such a typical monitoring system has the following problems.

First, a blank of monitoring occurs from a moment when a breakdown occurs in one component of a surveillance camera to a moment when the broken surveillance camera is replaced with a temporary camera (a completion time point of operation S3).

Second, a maintenance person or an installer of an installation company has to perform a visit twice (operations S2 and S8), perform collection of a broken camera (operation S3), and perform a diagnosis (operation S4).

The problems disclosed in this Background section were already known to the inventors of the present invention before achieving the present invention or are technical problems acquired in the process of achieving the present invention. Therefore, it may contain problems that do not form the prior art that is already known in this country to a person of ordinary skill in the art.

DETAILED DESCRIPTION OF THE INVENTION

Technical Problem

Provided are a predictive diagnostic device and a monitoring system enabling no blank of monitoring to happen and accordingly, improving the convenience of a maintenance person or an installer of an installation company.

Solution to Problem

According to an aspect of the present disclosure, a predictive diagnostic device includes a controller and a warning unit.

The controller is configured to periodically predict a future breakdown date of at least one component of a surveillance camera according to characteristic information of the at least one component of the surveillance camera and information on an operation environment of the surveillance camera.

The warning unit is configured to provide a warning when the predicted future breakdown date is within a predetermined time period from a current date.

According to another aspect of the present disclosure, a monitoring system employing the predictive diagnostic device includes a surveillance camera and a monitoring device.

The surveillance camera is configured to transmit information on its own operation environment to the monitoring device.

The monitoring device is configured to periodically predict a future breakdown date of at least one component of the surveillance camera according to the information on the operation environment and characteristic information of the at least one component of the surveillance camera and provide a warning when the predicted future breakdown date is within a predetermined time period from a current date.

According to another aspect of the present disclosure, a monitoring system employing the predictive diagnostic device includes each surveillance camera and a monitoring device.

The monitoring device is configured to display a live-view moving picture from the each surveillance camera and control an operation of the each surveillance camera according to input signals of a security person.

The each surveillance camera is configured to transmit information on its own operation environment to the monitoring device.

The monitoring device is configured to periodically predict a future breakdown date of each component of the each surveillance camera according to the information on the operation environment of the each surveillance camera and characteristic information of the each component of the each surveillance camera, and provide a warning when the predicted future breakdown date is within a predetermined time period from a current date.

According to another aspect of the present disclosure, a monitoring system includes surveillance cameras installed in at least a first surveillance area and a second surveillance area, a monitoring device of the first surveillance area, and a monitoring device of the second surveillance area.

The monitoring device of the first surveillance area is configured to display live-view moving pictures from the surveillance cameras installed in the first surveillance area and control an operation of each of the surveillance cameras installed in the first surveillance area according to input signals of a security person of the first surveillance area.

The monitoring device of the second surveillance area is configured to display live-view moving pictures from the surveillance cameras installed in the second surveillance area and control an operation of each of the surveillance cameras installed in the second surveillance area according to input signals of a security person of the second surveillance area.

The monitoring system further includes a predictive diagnostic server.

Information on an operation environment of each of the surveillance cameras in the first surveillance area is transmitted to the predictive diagnostic server via the monitoring device of the first surveillance area.

Information on an operation environment of each of the surveillance cameras in the second surveillance area is transmitted to the predictive diagnostic server via the monitoring device of the second surveillance area.

The predictive diagnostic server is configured to periodically predict a future breakdown date of each component of each of the surveillance cameras according to the information on the operation environment of each of the surveillance cameras and characteristic information of the each component of each of the surveillance cameras, and provide a warning when the predicted future breakdown date is within a predetermined time period from a current date.

Advantageous Effects of Disclosure

The predictive diagnostic devices and the monitoring systems employing the same according to embodiments of the present disclosure periodically predict a future breakdown date of a component of a surveillance camera according to characteristic information of the component of the surveillance camera and information on an operation environment of the surveillance camera, and provide a warning when the predicted future breakdown date is within a predetermined time period from a current date.

For example, when the predicted future breakdown date is within the predetermined time period from the current date, the model name of a surveillance camera including a warning-target component, the model name of the warning-target component, and a time period from the current date to the future breakdown date are displayed and notified, and the notification is made to the mobile terminal of at least one of a maintenance person, an installer, and a security person. Thus, a component that is predicted to be broken may be previously replaced at a suitable time point.

Accordingly, the following effects occur.

First, a breakdown of a surveillance camera due to the lifespan of a component of the surveillance camera may not be generated. In other words, a blank of monitoring due to breakdown of the surveillance camera may be removed.

Second, a maintenance person or an installer of an installation company may prevent occurrence of a breakdown of the surveillance camera by performing only one visit with a new component for a breakdown-predicted component, according to the contents of the warning. Accordingly, the convenience of the maintenance person or the installer of the installation company may increase.

BRIEF DESCRIPTION OF DRAWINGS

FIG. 6 is a look-up table of component characteristic information stored in an information storage of FIG. 3.

FIG. 7 is a look-up table of operation environment information stored in the information storage of FIG. 3.

BEST MODE

The following description and attached drawings are to understand operations according to the present disclosure, and matters that may be easily embodied by one of ordinary skill in the art to which the present disclosure pertains will not be described.

The present specification and drawings are not provided to limit the present disclosure, and the scope of the present disclosure should be defined by the following claims. Terms used herein should be interpreted as having a meaning and a concept that are consistent with the technical spirit of the present disclosure.

Hereinafter, embodiments of the present disclosure will be described more fully with reference to the accompanying drawings.

Figure 2:
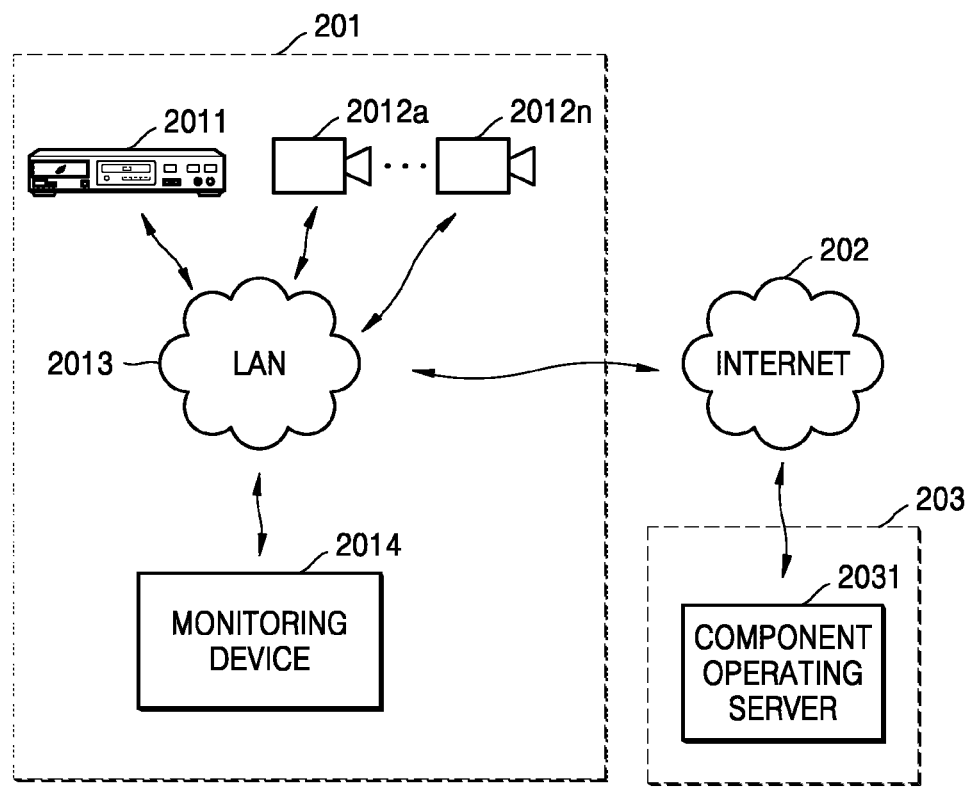
FIG. 2 is a schematic diagram of a structure of a monitoring system according to an embodiment of the present disclosure.

FIG. 2 is a schematic diagram of a structure of a monitoring system 201 according to an embodiment of the present disclosure. In FIG. 2, reference numeral 201 indicates a surveillance area, and reference numeral 203 indicates a manufacturing company of surveillance cameras 2012a through 2012n. The monitoring system 201 will now be described with reference to FIG. 2.

In the monitoring system 201 according to the present embodiment, the surveillance cameras 2012a through 2012n, a video recorder 2011, and a monitoring device 2014 may communicate with one another via a local area network (LAN) 2013.

Live-view moving pictures from the surveillance cameras 2012a through 2012n are transmitted to the video recorder 2011 and the monitoring device 2014 via the LAN 2013.

The monitoring device 2014 displays the live-view moving pictures from the surveillance cameras 2012a through 2012n and controls operations of the surveillance cameras 2012a through 2012n according to input signals of a security person.

The monitoring device 2014 performs a function of a predictive diagnostic device according to the present disclosure.

Characteristic information of at least one or each of the components of each of the surveillance cameras 2012*a* through 2012*n* is transmitted from a component operating server 2031 included in the manufacturing company 203 to the monitoring device 2014 via the Internet 202 and the LAN 2013.

Each of the surveillance cameras 2012*a* through 2012*n* transmits information on its own operation environment to the monitoring device 2014.

The monitoring device 2014 periodically predicts a future breakdown date of each of the components of each of the surveillance cameras 2012*a* through 2012*n* according to the information on the operation environment and the characteristic information of the at least one or each of the components and provides a warning when the predicted future breakdown date is within a predetermined time period from a current date.

During the warning, the monitoring device 2014 displays and notifies the model name of a surveillance camera including a warning-target component, the model name of the warning-target component, and a time period from the current date to the future breakdown date, and the notification is made to a mobile terminal of at least one of a maintenance person, an installer, and the security person.

For example, the following warnings are displayed and notified:

"An IR LED of the SNP6230 PTZ camera is predicted to be broken after 13 days."

Thus, a component that is predicted to be broken may be previously replaced at a suitable time point.

Accordingly, the following effects occur.

First, breakdowns of the surveillance cameras 2012*a* through 2012*n* due to the lifespan of their components are not generated. In other words, a blank of monitoring due to breakdowns of the surveillance cameras 2012*a* through 2012*n* may be removed.

Second, a maintenance person or an installer of an installation company may prevent occurrence of breakdowns of the surveillance cameras 2012*a* through 2012*n* by performing only one visit with a new component for a breakdown-predicted component according to the contents of the warning. Accordingly, the convenience of the maintenance person or the installer of the installation company may increase.

Figure 3:
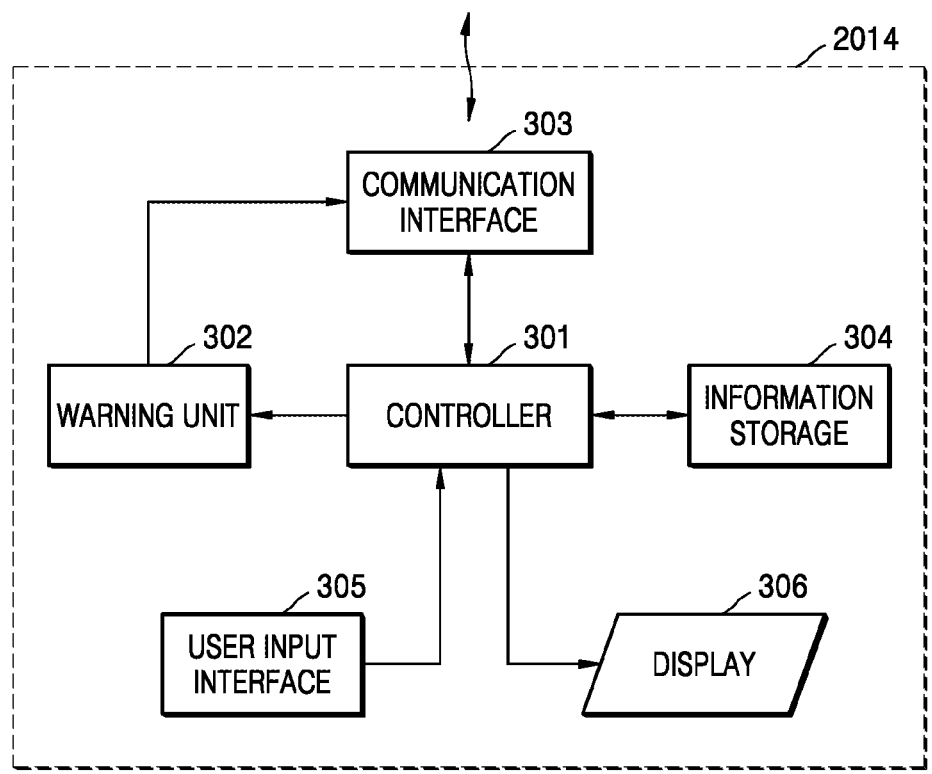
FIG. 3 is a block diagram of an internal structure of a monitoring device of FIG. 2.

FIG. 3 is a block diagram of an internal structure of the monitoring device 2014 of FIG. 2. The internal structure and an operation of the monitoring device 2014 will now be described with reference to FIGS. 2 and 3.

The monitoring device 2014 functioning as the predictive diagnostic device according to the present disclosure includes a controller 301 and a warning unit 302.

The controller 301 periodically predicts the future breakdown date of at least one or each of the components of each of the surveillance cameras 2012*a* through 2012*n* according to the characteristic information of the at least one or each of the components of the surveillance cameras 2012*a* through 2012*n* and the information on the operation environment of each of the surveillance cameras 2012*a* through 2012*n*.

The warning unit 302 provides a warning when the future breakdown date predicted by the controller 301 is within the predetermined time period from the current date. In more detail, the warning unit 302 displays and notifies the model name of a surveillance camera including a warning-target component, the model name of the warning-target component, and a time period from the current date to the future breakdown date, and the notification is made to the mobile terminal of at least one of the maintenance person, the installer, and the security person.

According to the present embodiment, the monitoring device 2014 functioning as the predictive diagnostic device according to the present disclosure further includes a communication interface 303, an information storage 304, a user input interface 305, and a display 306.

The communication interface 303 receives the characteristic information of the at least one of the components of each of the surveillance cameras 2012*a* through 2012*n*, the information on the operation environment of each of the surveillance cameras 2012*a* through 2012*n*, and moving pictures from the surveillance cameras 2012*a* through 2012*n*, and provides them to the controller 301.

The information storage 304 stores the information received from the controller 301 and provides the information stored therein to the controller 301.

The user input interface 305 inputs camera control signals of the security person to the controller 301.

The display 306 displays a moving picture received from the controller 301.

Figure 4:
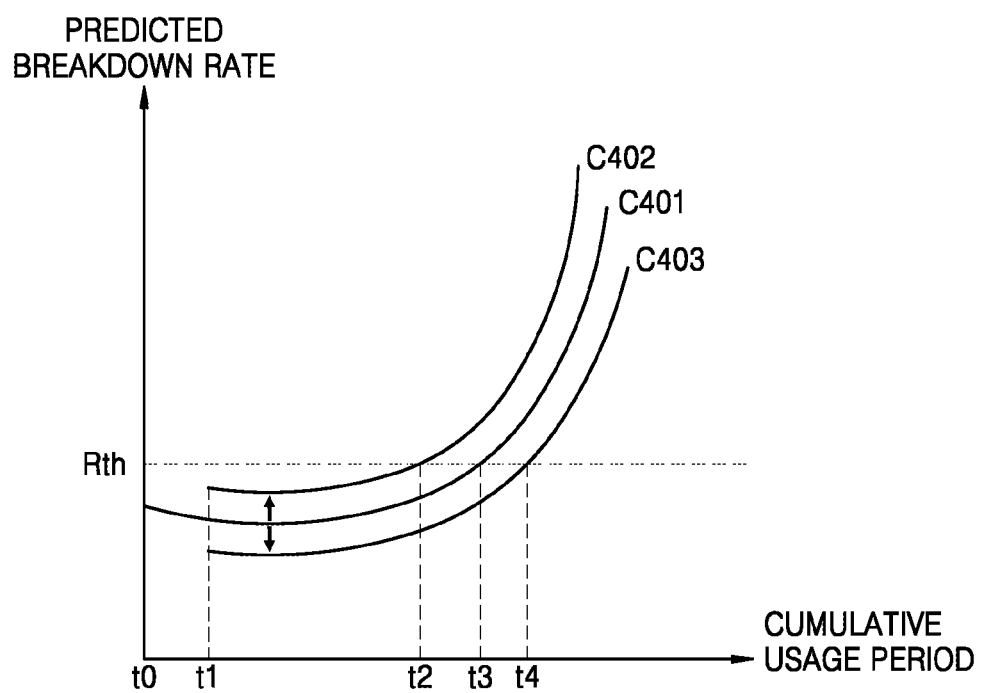
FIG. 4 is a graph for explaining an operation of a controller of FIG. 3.

FIG. 4 is a graph for explaining an operation of the controller 301 of FIG. 3. In FIG. 4, reference numerals C401 through C403 indicate characteristic curves of predicted breakdown rates with respect to cumulative usage periods of one component of one camera. In detail, reference numeral C401 indicates a characteristic curve used at a previous period. Reference numeral C402 or C403 indicates a characteristic curve to be used from a current time point.

Referring to FIG. 4, the controller 301 of FIG. 3 refers to data of a predicted breakdown rate with respect to a cumulative usage period of one component of a camera (data due to the characteristic curve C401) and determines a date when the predicted breakdown rate is equal to a threshold breakdown rate Rth (a date at a time point t3) to be the future breakdown date.

The controller 301 changes the future breakdown date due to an increase in a predicted breakdown rate after the current date, according to information on an operation environment of a surveillance camera and component characteristic information of the surveillance camera. An example where a time point t1 is a current prediction time point will be described as follows.

Assuming that the characteristic curve C401 used at a previous period does not change, the lifespan of a component is a time period from t0 to t3 and a residual lifespan thereof is a time period from t1 to t3. Thus, when the date of the time point t3 is within a predetermined time period from the current date, the controller 301 controls the warning unit 302 to provide a warning.

At the current prediction time point t1, when the predicted breakdown rate increases according to the operation environment of the surveillance camera and the characteristics of the component of the surveillance, the controller 301 increases a predicted breakdown rate after the current date (C402 is applied). In this case, the lifespan of the component is reduced to a time period from t0 to t2, and the residual lifespan thereof is a time period from t1 to t2. Thus, when the date of the time point t2 is within a predetermined time period from the current date, the controller 301 controls the warning unit 302 to provide a warning.

At the current prediction time point t1, when the predicted breakdown rate decreases according to the operation environment of the surveillance camera and the characteristics of the component of the surveillance camera, the controller 301 decreases a predicted breakdown rate after the current date (C403 is applied). In this case, the lifespan of the component is increased to a time period from t0 to t3, and the residual lifespan thereof is a time period from t1 to t4. Thus, when the date of the time point t4 is within a predetermined time period from the current date, the controller 301 controls the warning unit 302 to provide a warning.

Figure 5:
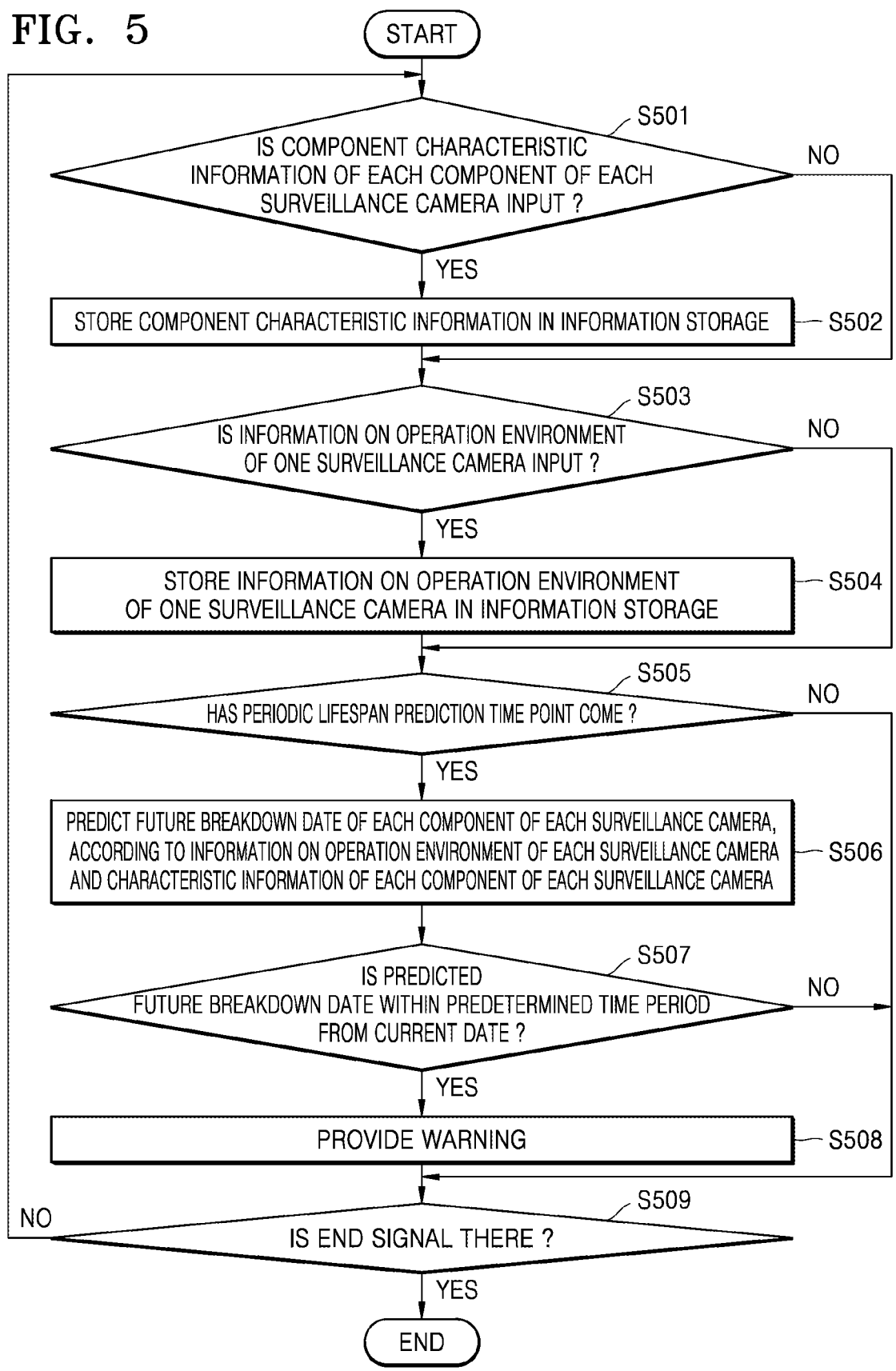
FIG. 5 is a flowchart of an operation of the controller of FIG. 3.

FIG. 5 is a flowchart of an operation of the controller 301 of FIG. 3. The operation of the controller 301 will now be described with reference to FIGS. 2, 3, and 5.

Component characteristic information 601 of FIG. 6 of each of the components of each of the surveillance cameras 2012a through 2012n is transmitted from the component operating server 2031 to the controller 301 via the Internet 202, the LAN 2013, and the communication interface 303. When the component characteristic information 601 is input in operation S501, the controller 301 stores the component characteristic information 601 in the information storage 304, in operation S502.

The component characteristic information 601 is periodically transmitted from each of the surveillance cameras 2012a through 2012n to the controller 301 via the LAN 2013 and the communication interface 303. When information on an operation environment of one surveillance camera is input in operation S503, the controller 301 stores the information on the operation environment of the surveillance camera in the information storage 304, in operation S504.

When a periodic lifespan prediction time point has come in operation S505, the controller 301 predicts the future breakdown date of each of the components of each of the surveillance cameras 2012a through 2012n, according to the information on the operation environment of each of the surveillance cameras 2012a through 2012n and the characteristic information of each of the components of each of the surveillance cameras 2012a through 2012n, in operation S506.

When the predicted future breakdown date is within the predetermined time period from the current date in operation S507, the controller 301 provides a warning, in operation S508.

During the warning, the controller 301 displays and notifies the model name of a surveillance camera including a warning-target component, the model name of the warning-target component, and a time period from the current date to the future breakdown date, and the notification is made to a mobile terminal of at least one of the maintenance person, the installer, and the security person.

FIG. 6 is a look-up table 601 of the component characteristic information stored in the information storage 304 of FIG. 3. A quality coefficient may be taken as a representative example of the component characteristic information 601 of the surveillance cameras 2012a through 2012n of FIG. 2.

FIG. 7 is a look-up table 701 of operation environment information stored in the information storage 304 of FIG. 3.

Referring to FIG. 7, operation environment information of the surveillance cameras 2012a through 2012n of FIG. 2 includes temperature information T from a temperature sensor included in each surveillance camera, rate information Rv of an applied voltage with respect to a rated voltage of each surveillance camera, humidity information H from a humidity sensor included in each surveillance camera, vibration information V from a gyro sensor included in each surveillance camera, information Tp of a cumulative panning time period, information Tt of a cumulative tilting time period, and information Tz of a cumulative zooming time period.

Targets to be applied within this operation environment information are variously set depending on the types of components.

Figure 8:
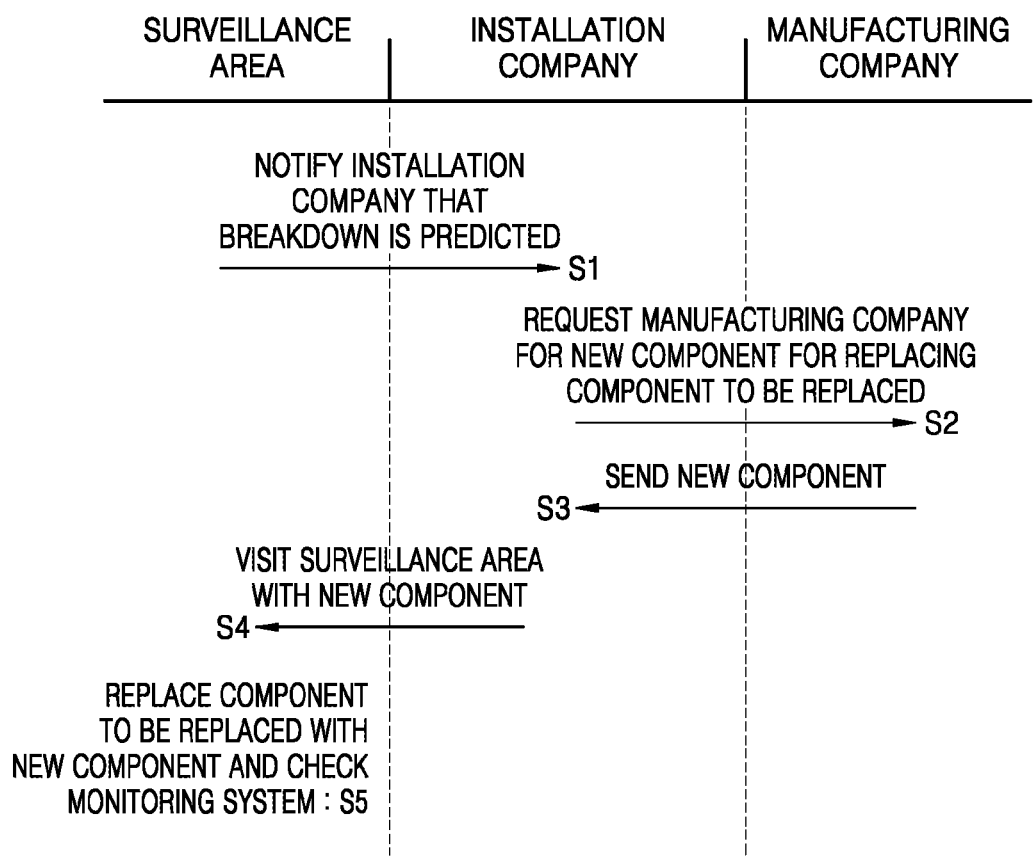
FIG. 8 is a diagram for explaining a breakdown management process in the monitoring system of FIG. 2.

FIG. 8 is a diagram for explaining a breakdown management process in the monitoring system 201 of FIG. 2. The breakdown management process of FIG. 8 will now be described with reference to FIGS. 1 and 8 as follows.

When the predicted future breakdown date is within the predetermined time period from the current date, the monitoring device 2014 in the surveillance area notifies the mobile terminal of the maintenance person or installer of the installation company that a breakdown is predicted, in operation S 1.

In operation S1, when a breakdown occurs, a security person within the surveillance area reports the breakdown to the maintenance person or the installer of the installation company.

Accordingly, in operation S2, the maintenance person or the installer requests the manufacturing company of the broken camera for a new component for replacing a component to be replaced.

Next, in operation S3, a person in charge of the manufacturing company sends the new component to the maintenance person or the installer.

Next, in operation S4, the maintenance person or the installer visits the surveillance area with the new component.

In operation S5, the maintenance person or the installer replaces the component to be replaced with the new component and then checks the monitoring system.

Figure 1:
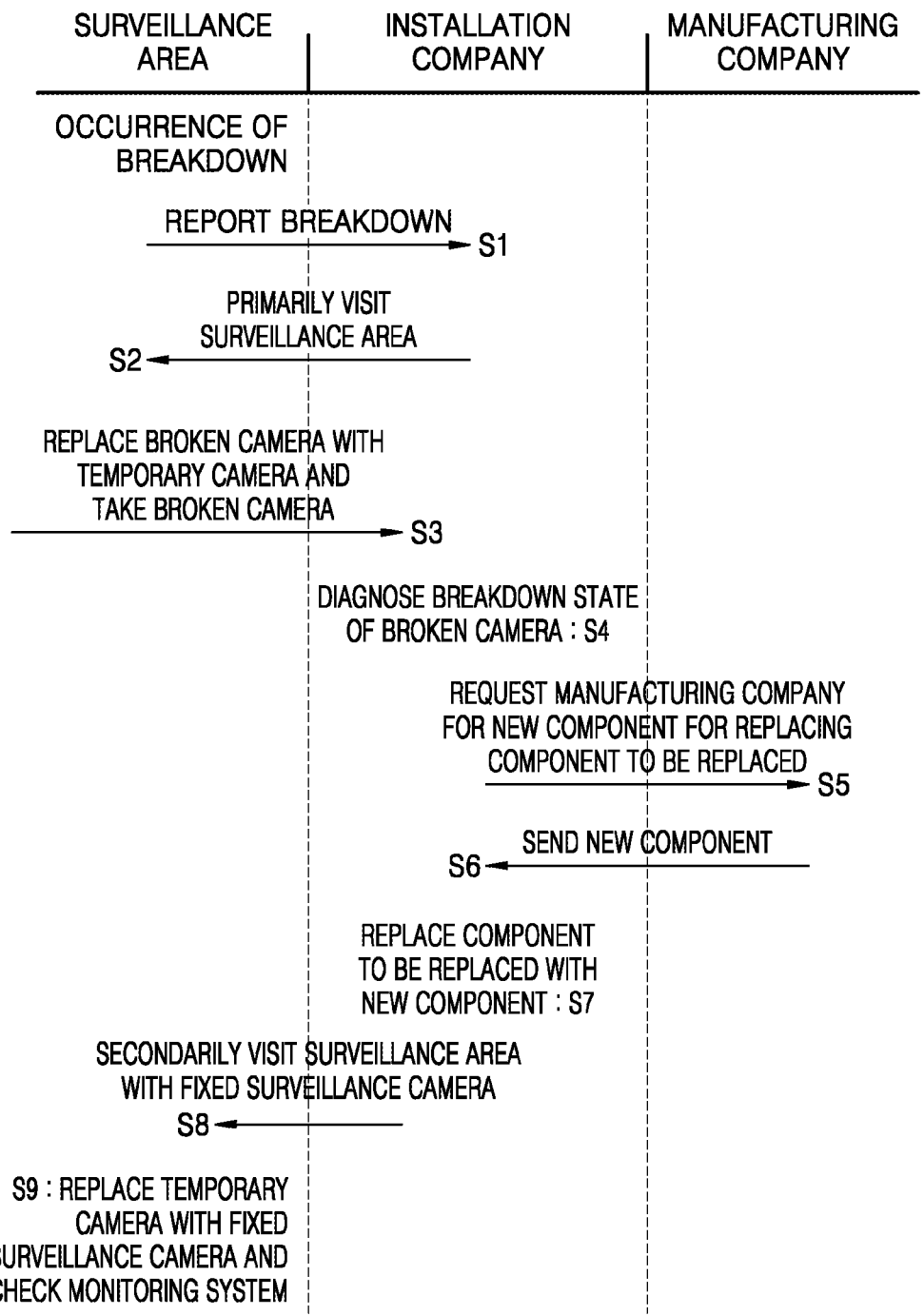
FIG. 1 is a diagram for explaining a breakdown management process in a typical monitoring system.

In the process of FIG. 8, compared with the process of FIG. 1, the monitoring system 201 according to the present embodiment may determine that a component predicted to be broken is previously replaced at a suitable time point. In other words, the monitoring system 201 according to the present embodiment has the following effects.

First, breakdowns of the surveillance cameras 2012a through 2012n due to the lifespan of components thereof are not generated. In other words, a blank of monitoring due to the breakdowns of the surveillance cameras 2012a through 2012n may be removed.

Second, a maintenance person or an installer of an installation company may prevent occurrence of breakdowns of the surveillance cameras 2012a through 2012n by performing only one visit with a new component for a breakdown-predicted component according to the contents of the warning. Accordingly, the convenience of the maintenance person or the installer of the installation company may increase.

Figure 9:
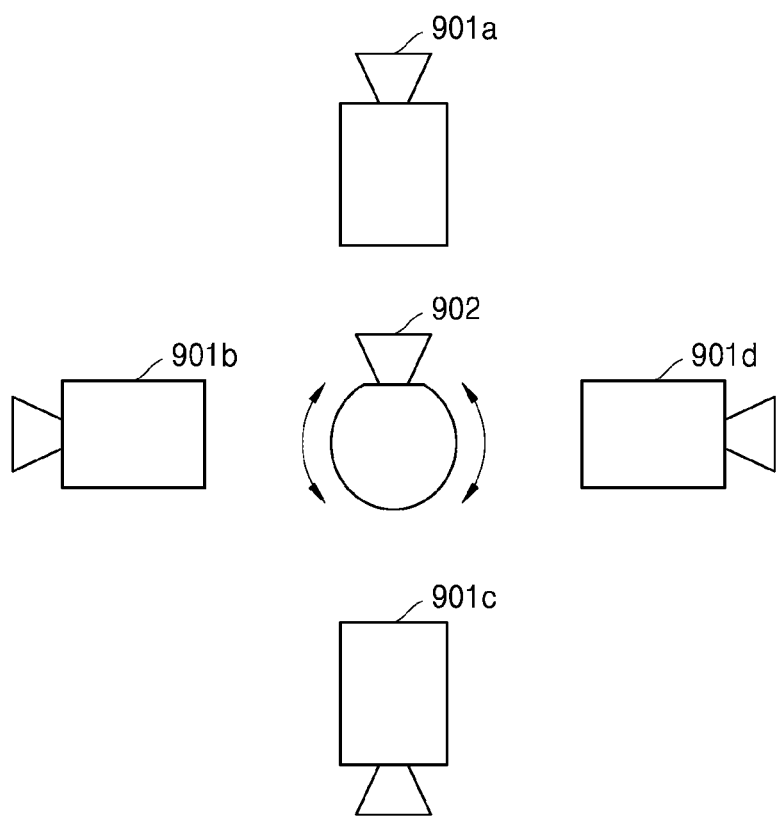
FIG. 9 is a plan view for explaining first through fifth cameras installed at the same location from among cameras of FIG. 2.

FIG. 9 is a plan view for explaining first through fifth cameras 902 and 901a through 901c installed at the same location from among the cameras of FIG. 2.

Figure 10:
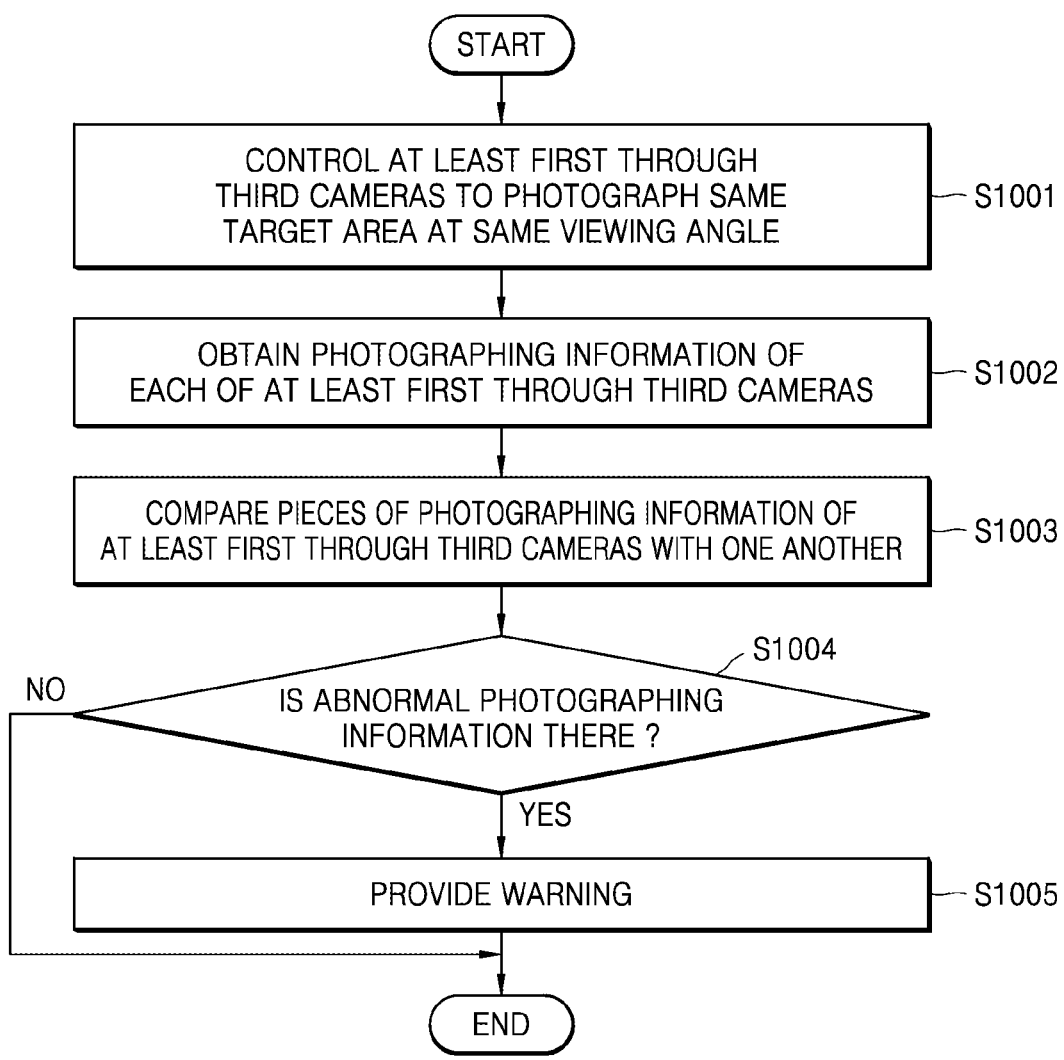
FIG. 10 is a flowchart of a diagnosis algorithm of at least first through third cameras capable of photographing the same target area at the same viewing angle.

FIG. 10 is a flowchart of a diagnosis algorithm of at least first through third cameras capable of photographing the same target area at the same viewing angle.

When at least the first and second cameras from among the at least first through third cameras installed at the same location are able to perform panning, tilting, and zooming, the monitoring device 2014 of FIG. 2 periodically performs a diagnosis mode of the at least first through third cameras by periodically performing the diagnosis algorithm of FIG. 10. The diagnosis algorithm of FIG. 10 will now be described with reference to FIGS. 2, 9, and 10.

In operation S1001, the monitoring device 2014 controls the at least first through third cameras to photograph the same target area at the same viewing angle.

For example, when only the first camera 902 and the second camera 901*a* are able to perform panning, tilting, and zooming, the first camera 902 and the second camera 901*a* are controlled to photograph the same target area at the same viewing angle as the third camera 901*b* the fourth camera 901*c*, or the fifth camera 901*d*.

Next, in operation S1002, the monitoring device 2014 obtains photographing information of each of the at least first through third cameras.

Next, in operation S1003, the monitoring device 2014 compares the pieces of photographing information of the at least first through third cameras with one another.

When, as a result of the comparison, pieces of photographing information of two cameras from among the pieces of photographing information of the at least first through third cameras are similar to each other and the photographing information of the other camera is not similar, the photographing information of the other camera is determined to be abnormal. When there is abnormal photographing information as such in operation S1004, the monitoring device 2014 provides a warning. Of course, before a warning is provided, operations S1001 through S1004 may be performed again after an abnormal camera is initialized.

According to the diagnosis algorithm of FIG. 10, in the diagnosis mode, while monitoring of cameras not performing panning, tilting, and zooming (for example, the third camera 901*b*, the fourth camera 901*c*, or the fifth camera 901*d*) is maintained, diagnosis may be performed.

However, when only the first camera 902 among the first through fifth cameras is able to perform panning, tilting, and zooming, the diagnosis algorithm of FIG. 10 cannot be employed. In this case, a diagnosis algorithm of FIG. 11 is employed.

Figure 11:
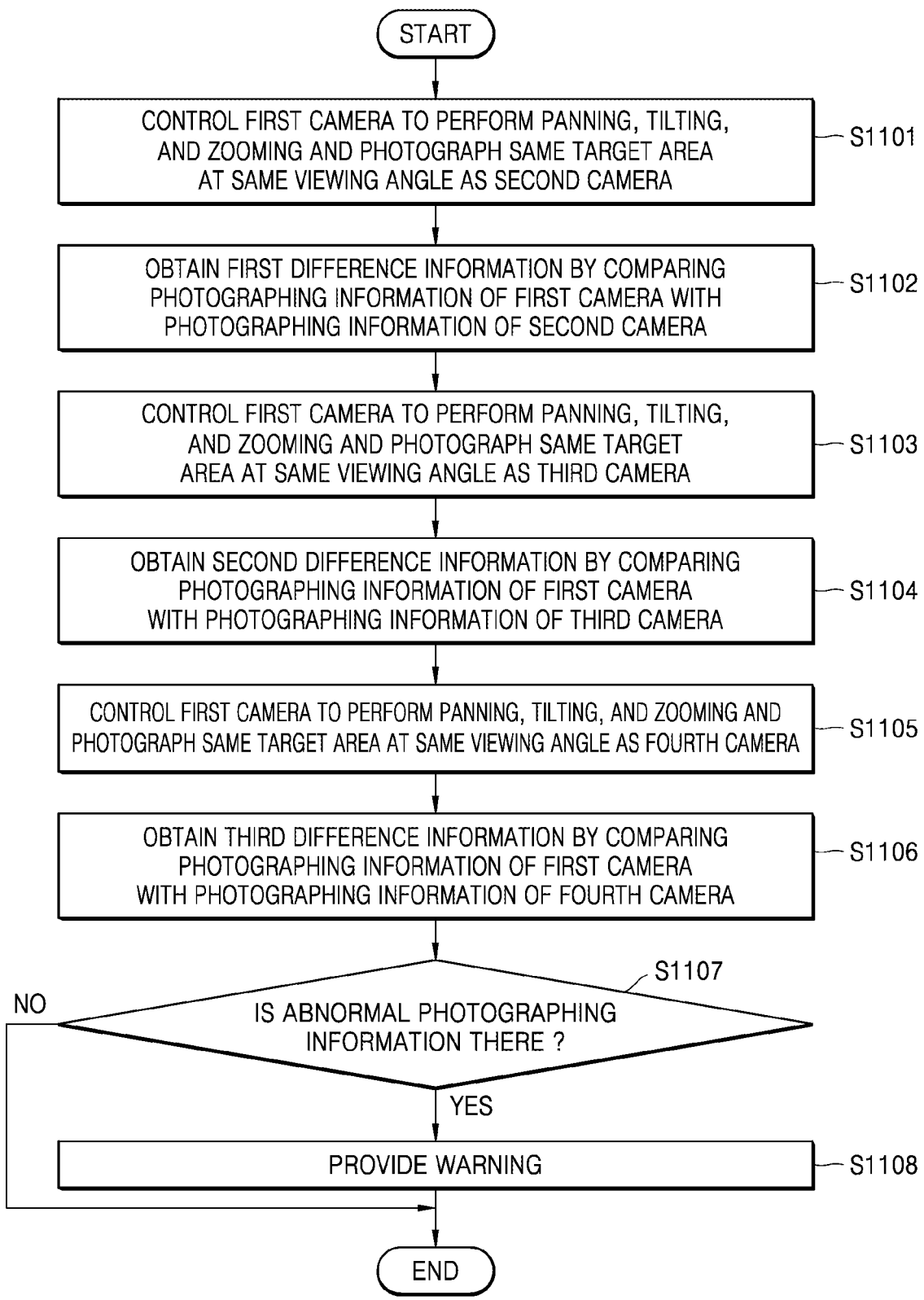
FIG. 11 is a flowchart of a diagnosis algorithm of first through fourth cameras among which only one camera is able to perform panning, tilting, and zooming.

FIG. 11 is a flowchart of a diagnosis algorithm of first through fourth cameras among which only one camera is able to perform panning, tilting, and zooming.

When only the first camera 902 from among at least first through fourth cameras 902 and 901*a* through 901*c* installed at the same location is able to perform panning, tilting, and zooming, the monitoring device 2014 of FIG. 2 periodically performs a diagnosis mode of at least the second through fourth cameras 901*a* through 901*c* by periodically performing the diagnosis algorithm of FIG. 11. The diagnosis algorithm of FIG. 11 will now be described with reference to FIGS. 2, 9, and 11.

In operation S1101, the monitoring device 2014 controls the first camera 902 to perform panning, tilting, and zooming and photograph the same target area at the same viewing angle as the second camera 901*a*.

Next, in operation S1102, the monitoring device 2014 obtains first difference information by comparing photographing information of the first camera 902 with photographing information of the second camera 901*a*.

Next, in operation S1103, the monitoring device 2014 controls the first camera 902 to perform panning, tilting, and zooming and photograph the same target area at the same viewing angle as the third camera 901*b*.

Next, in operation S1104, the monitoring device 2014 obtains second difference information by comparing the photographing information of the first camera 902 with photographing information of the third camera 901*b*.

Next, in operation S1105, the monitoring device 2014 controls the first camera 902 to perform panning, tilting, and zooming and photograph the same target area at the same viewing angle as the fourth camera 901*c*.

Next, in operation S1106, the monitoring device 2014 obtains third difference information by comparing the photographing information of the first camera 902 with photographing information of the fourth camera 901*c*.

Next, in operation S1107, the monitoring device 2014 determines whether each of the second through fourth cameras 901*a* through 901*c* is abnormal, according to a result of a comparison between the first through third difference information.

For example, when the first difference information is similar to the second difference information and the third difference information is not similar to the first and second difference information, the third difference information is estimated as abnormal difference information.

When the abnormal difference information exists as such, the monitoring device 2014 provides a warning, in operation S1108. For example, when the first difference information is abnormal, the monitoring device 2014 provides a warning indicating that the second camera 901*a* is abnormal. In this case, before the warning is provided, operations S1101, S1102, and S1103 may be performed again after the abnormal camera is initialized.

According to the diagnosis algorithm of FIG. 11, in the diagnosis mode, while monitoring of cameras not performing panning, tilting, and zooming, for example, the second through fourth cameras 901*a* through 901*c*, is maintained, diagnosis may be performed.

Figure 12:
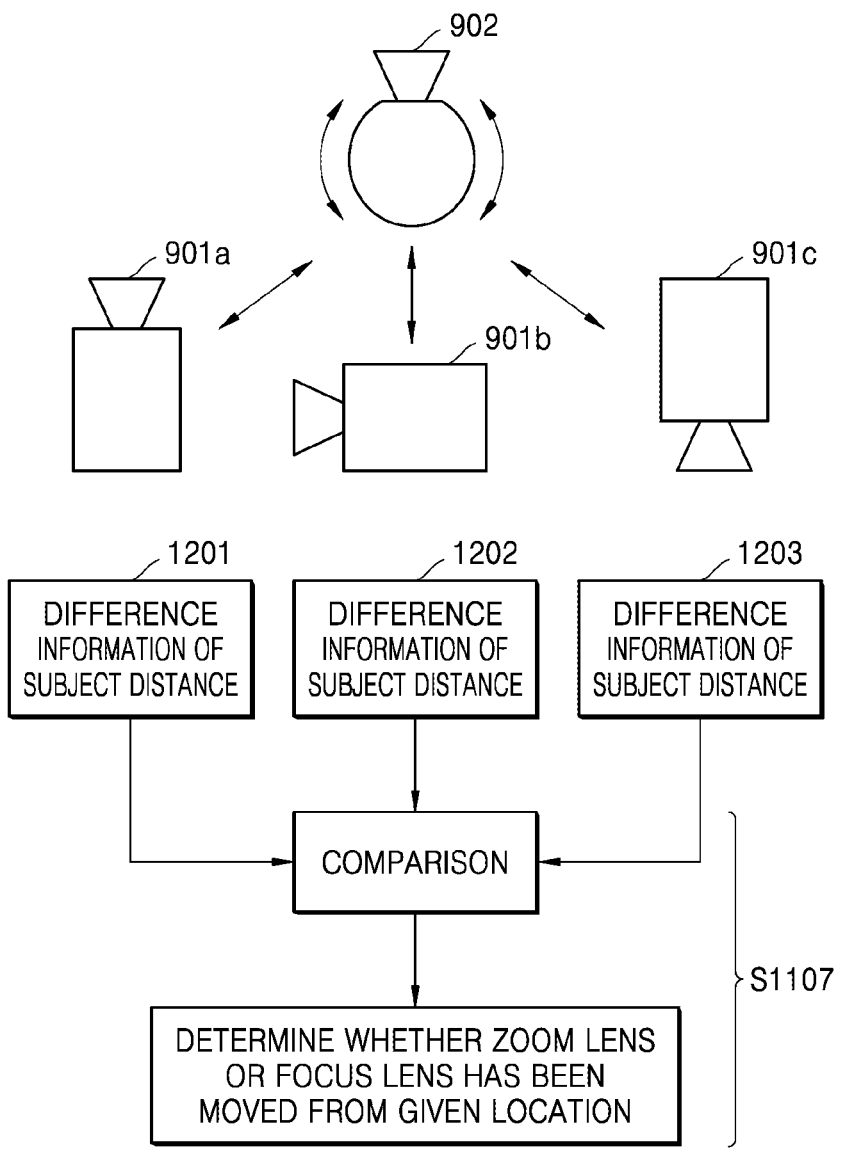
FIG. 12 is a schematic diagram for explaining a first example of the diagnosis algorithm of FIG. 11.

FIG. 12 is a schematic diagram for explaining a first example of the diagnosis algorithm of FIG. 11. In FIGS. 9 and 12, like reference numerals or characters indicate like targets of the same functions. The first example of the diagnosis algorithm of FIG. 11 will now be described with reference to FIGS. 11 and 12 as follows.

The first difference information in operation S1102 is difference information 1201 indicating a difference between a subject distance from the first camera 902 and a subject distance from the second camera 901*a*.

The second difference information in operation S1104 is difference information 1202 indicating a difference between the subject distance from the first camera 902 and a subject distance from the third camera 901*b*.

The third difference information in operation S1106 is difference information 1203 indicating a difference between the subject distance from the first camera 902 and a subject distance from the fourth camera 901*c*.

The monitoring device 2014 of FIG. 2 determines whether a zoom lens or a focus lens of each of the second through fourth cameras 901*a* through 901*c* has been moved from a given location, according to a result of a comparison between the pieces of first through third difference information 1201 through 1203 (S1107).

Figure 13:
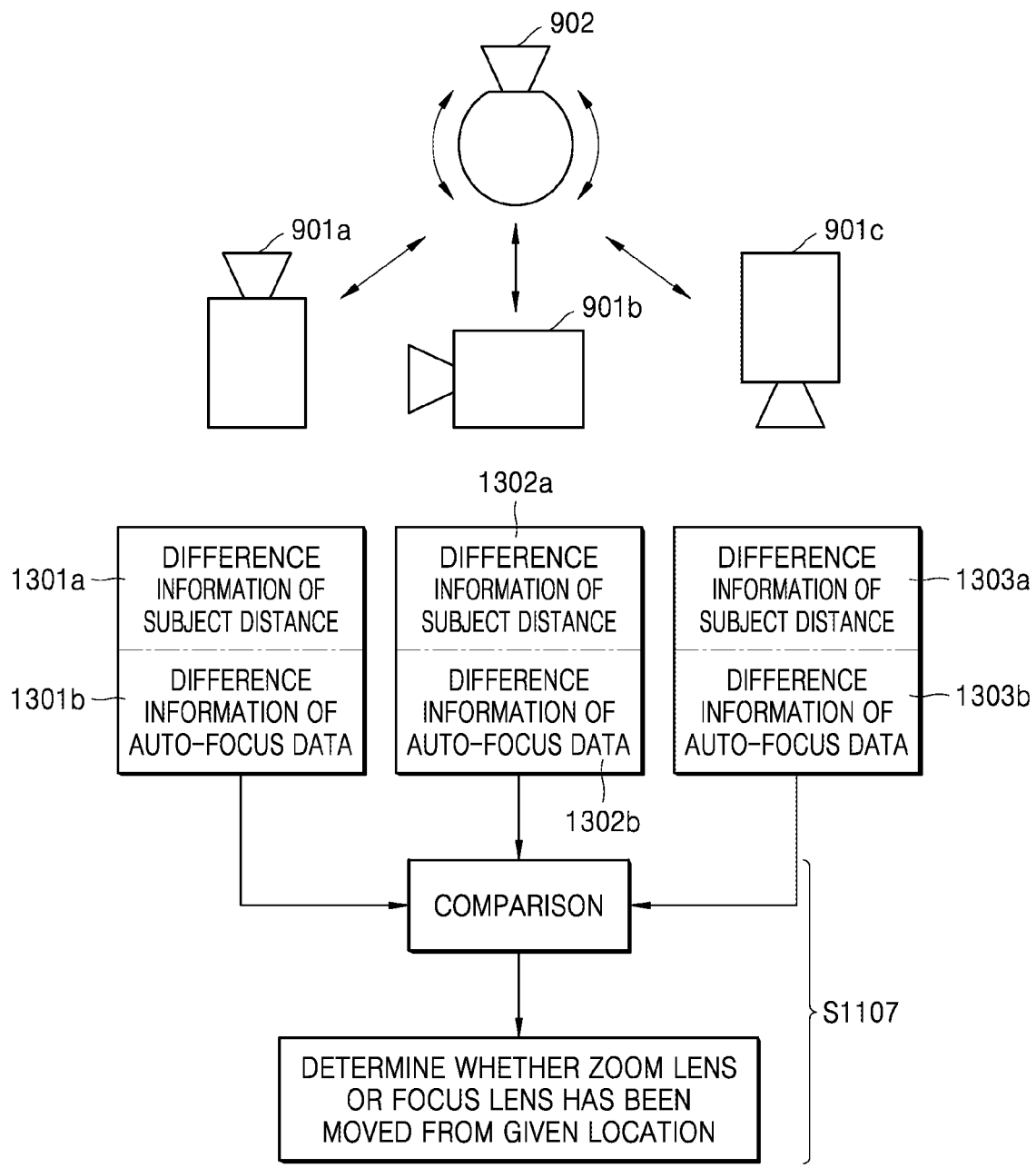
FIG. 13 is a schematic diagram for explaining a second example of the diagnosis algorithm of FIG. 11.

FIG. 13 is a schematic diagram for explaining a second example of the diagnosis algorithm of FIG. 11. In FIGS. 9 and 13, like reference numerals or characters indicate like targets of the same functions. The second example of the diagnosis algorithm of FIG. 11 will now be described with reference to FIGS. 11 and 13 as follows.

The first difference information in operation S1102 includes difference information 1301*a* indicating a difference between the subject distance from the first camera 902 and the subject distance from the second camera 901*a*, and difference information 1301*b* indicating a difference between auto-focus data at the first camera 902 and auto-focus data at the second camera 901*a*.

The second difference information in operation S1104 includes difference information 1302*a* indicating a difference between the subject distance from the first camera 902 and the subject distance from the third camera 901*b*, and difference information 1302*b* indicating a difference between the auto-focus data at the first camera 902 and auto-focus data at the third camera 901*b*.

The third difference information in operation S1106 includes difference information 1303*a* indicating a difference between the subject distance from the first camera 902 and the subject distance from the fourth camera 901*c*, and difference information 1303*b* indicating a difference between the auto-focus data at the first camera 902 and auto-focus data at the fourth camera 901*c*.

The monitoring device 2014 of FIG. 2 determines whether the zoom lens or focus lens of each of the second through fourth cameras 901*a* through 901*c* has been moved from a given location, according to a result of a comparison between the pieces of first through third difference information 1301*a* through 1303*b* (S1107).

Figure 14:
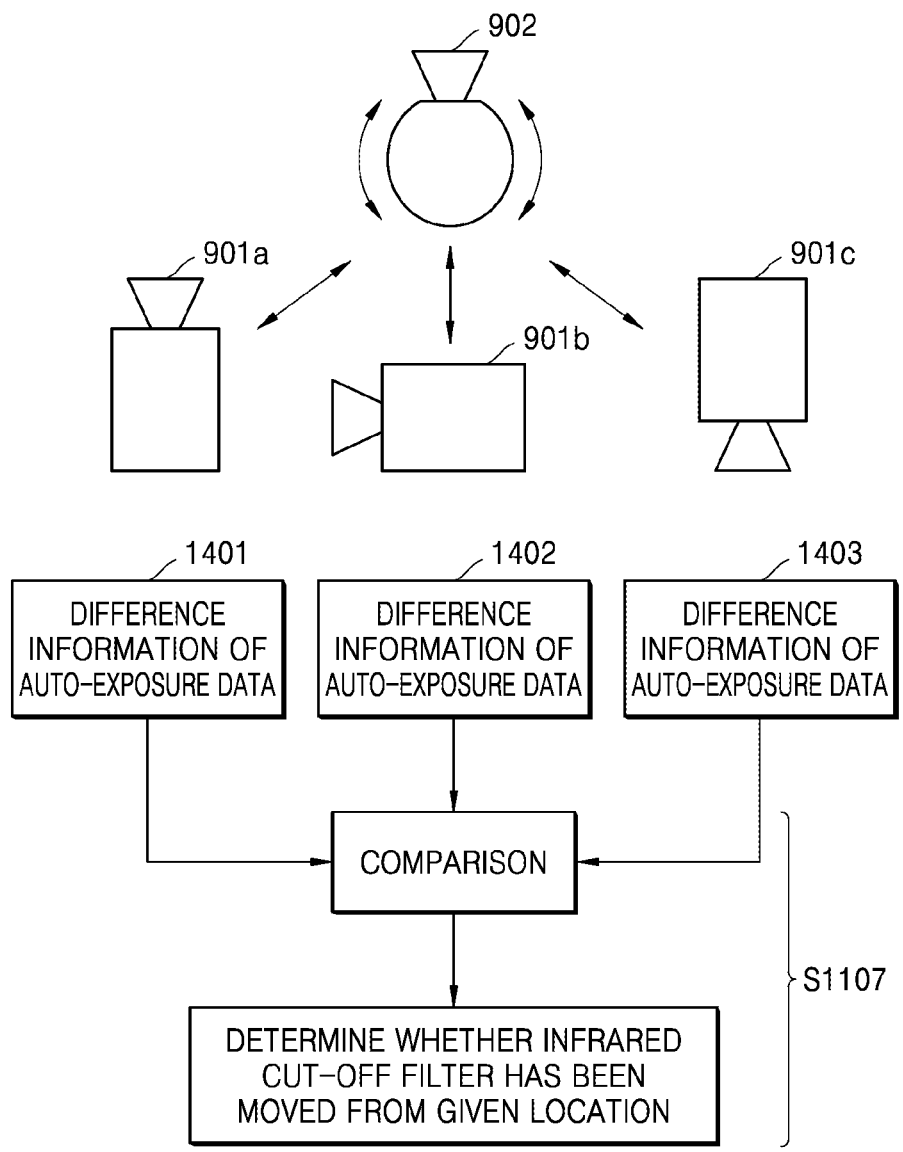
FIG. 14 is a schematic diagram for explaining a third example of the diagnosis algorithm of FIG. 11.

FIG. 14 is a schematic diagram for explaining a third example of the diagnosis algorithm of FIG. 11. In FIGS. 9 and 14, like reference numerals or characters indicate like targets of the same functions. The third example of the diagnosis algorithm of FIG. 11 will now be described with reference to FIGS. 11 and 14 as follows.

The first difference information in operation S1102 is difference information 1401 indicating a difference between auto-exposure data at the first camera 902 and auto-exposure data at the second camera 901*a*. As well known, the auto-exposure data includes the openness, the shutter speed, and the image-sensor gain of an iris.

The second difference information in operation S1104 is difference information 1402 indicating a difference between the auto-exposure data at the first camera 902 and auto-exposure data at the third camera 901*b*.

The third difference information in operation S1106 is difference information 1403 indicating a difference between the auto-exposure data at the first camera 902 and auto-exposure data at the fourth camera 901*c*.

The monitoring device 2014 of FIG. 2 determines whether an infrared cut-off filter of each of the second through fourth cameras 901*a* through 901*c* has been moved from a given location, according to a result of a comparison between the pieces of first through third difference information 1401 through 1403 (S1107). As well known, the infrared cut-off filter is also called a "Day/Night filter", and is turned on at daytime illumination and turned off at nighttime illumination.

Figure 15:
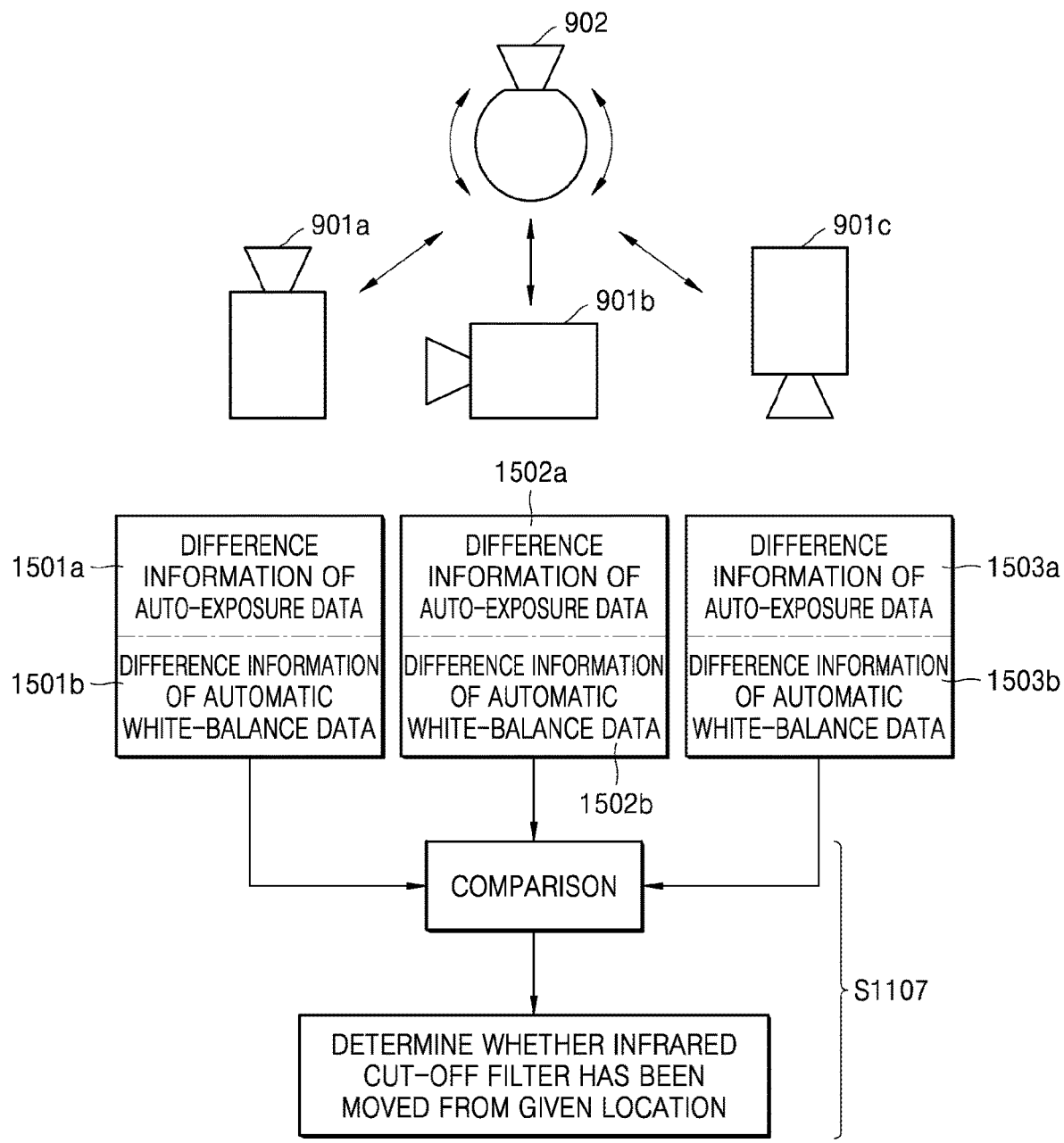
FIG. 15 is a schematic diagram for explaining a fourth example of the diagnosis algorithm of FIG. 11.

FIG. 15 is a schematic diagram for explaining a fourth example of the diagnosis algorithm of FIG. 11. In FIGS. 9 and 15, like reference numerals or characters indicate like targets of the same functions. The fourth example of the diagnosis algorithm of FIG. 11 will now be described with reference to FIGS. 11 and 15 as follows.

The first difference information in operation S1102 includes difference information 1501*a* indicating a difference between the auto-exposure data at the first camera 902 and the auto-exposure data at the second camera 901*a*, and difference information 1501*b* indicating a difference between automatic white-balance data at the first camera 902 and automatic white-balance data at the second camera 901*a*. As well known, the automatic white-balance data includes a white gain and a blue gain.

The second difference information in operation S1104 includes difference information 1502*a* indicating a difference between the auto-exposure data at the first camera 902 and the auto-exposure data at the third camera 901*b*, and difference information 1502*b* indicating a difference between the automatic white-balance data at the first camera 902 and automatic white-balance data at the third camera 901*b*.

The third difference information in operation S1106 includes difference information 1503*a* indicating a difference between the auto-exposure data at the first camera 902 and the auto-exposure data at the fourth camera 901*c*, and difference information 1503*b* indicating a difference between the automatic white-balance data at the first camera 902 and automatic white-balance data at the fourth camera 901*c*.

The monitoring device 2014 of FIG. 2 determines whether the infrared cut-off filter of each of the second through fourth cameras 901*a* through 901*c* has been moved from a given location, according to a result of a comparison between the pieces of first through third difference information 1501*a* through 1503*b* (S1107).

Mode of Disclosure

Figure 16:
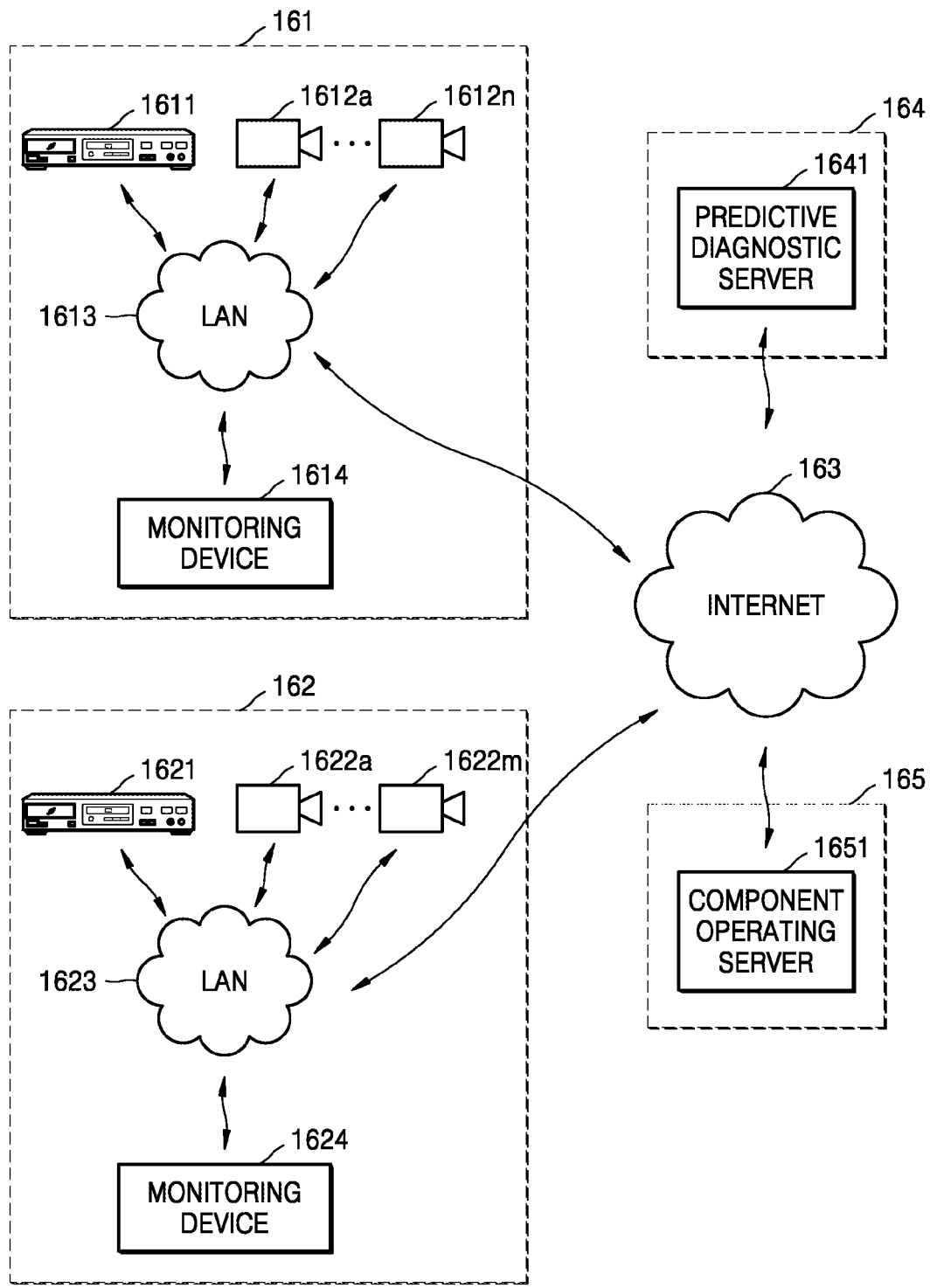
FIG. 16 is a schematic diagram of a structure of a monitoring system according to another embodiment of the present disclosure.

FIG. 16 is a schematic diagram of a structure of a monitoring system according to another embodiment of the present disclosure.

Referring to FIG. 16, the monitoring system includes surveillance cameras 1612*a* through 1612*n* and 1622*a* through 1622*m* installed in at least a first surveillance area 161 and a second surveillance area 162, a monitoring device 1614 of the first surveillance area 161, and a monitoring device 1624 of the second surveillance area 162.

In the first surveillance area 161, the surveillance cameras 1612*a* through 1612*n*, a video recorder 1611, and the monitoring device 1614 may communicate with one another via a LAN 1613.

In the second surveillance area 162, the surveillance cameras 1622*a* through 1622*m*, a video recorder 1621, and the monitoring device 1624 may communicate with one another via a LAN 1623.

The monitoring device 1614 of the first surveillance area 161 displays live-view moving pictures from the surveillance cameras 1612*a* through 1612*n* of the first surveillance area 161 and controls operations of the surveillance cameras 1612*a* through 1612*n* in the first surveillance area 161 according to input signals of a security person of the first surveillance area 161.

The monitoring device 1624 of the second surveillance area 162 displays live-view moving pictures from the surveillance cameras 1622*a* through 1622*m* of the second surveillance area 162 and controls operations of the surveillance cameras 1622*a* through 1622*m* in the second surveillance area 162 according to input signals of a security person of the second surveillance area 162.

The monitoring system according to another embodiment of the present disclosure may further include a predictive diagnostic server 1641 included in a predictive diagnostic center 164.

Information on an operation environment of each of the surveillance cameras 1612*a* through 1612*n* in the first surveillance area 161 is transmitted to the predictive diagnostic server 1641 via the monitoring device 1614 of the first surveillance area 161.

Information on an operation environment of each of the surveillance cameras 1622*a* through 1622*m* in the second surveillance area 162 is transmitted to the predictive diagnostic server 1641 via the monitoring device 1624 of the second surveillance area 162.

The predictive diagnostic server 1641 periodically predicts a future breakdown date of each of the components of each of the surveillance cameras 1612*a* through 1612*n* and 1622*a* through 1622*m* according to the information on the operation environment of each of the surveillance cameras 1612a through 1612n and 1622a through 1622m and characteristic information of each of the components of each of the surveillance cameras 1612a through 1612n and 1622a through 1622m, and provides a warning when the predicted future breakdown date is within a predetermined time period from a current date.

During the warning, the predictive diagnostic server 1641 displays and notifies the model name of a surveillance camera including a warning-target component, the model name of the warning-target component, and a time period from the current date to the future breakdown date, and the notification is made to a mobile terminal of at least one of a maintenance person, an installer, and a security person.

For example, the following warnings are displayed and notified:

"An IR LED of the SNP6230 PTZ camera in a second surveillance area is predicted to be broken after 13 days."

Thus, a component that is predicted to be broken may be previously replaced at a suitable time point.

The descriptions given with reference to FIGS. 3 through 15 are related with a detailed structure, a detailed operation, and effects of the monitoring device 2014 of FIG. 2. However, the descriptions given with reference to FIGS. 3 through 15 are equally applicable to the predictive diagnostic server 1641 of FIG. 16. Thus, a repeated description of the predictive diagnostic server 1641 will be omitted here.

As described above, predictive diagnostic devices and monitoring systems employing the same according to embodiments of the present disclosure periodically predict a future breakdown date of a component of a surveillance camera according to characteristic information of the component of the surveillance camera and information on an operation environment of the surveillance camera and provide a warning when the predicted future breakdown date is within a predetermined time period from a current date.

For example, when the predicted future breakdown date is within the predetermined time period from the current date, the model name of a surveillance camera including a warning-target component part, the model name of the warning-target component part, and a time period from the current date to the future breakdown date are displayed and notified, and the notification is made to the mobile terminal of at least one of a maintenance person, an installer, and a security person. Thus, a component that is predicted to be broken may be previously replaced at a suitable time point.

Accordingly, the following effects occur.

First, a breakdown of a surveillance camera due to the lifespan of a component of the surveillance camera may not be generated. In other words, a blank of monitoring due to breakdown of the surveillance camera may be removed.

Second, a maintenance person or an installer of an installation company may prevent occurrence of a breakdown of the surveillance camera by performing only one visit with a new component for a component that is predicted to be broken, according to warning contents. Accordingly, the convenience of the maintenance person or the installer of the installation company may increase.

While the present disclosure has been particularly shown and described with reference to preferred embodiments thereof, it will be understood by those skilled in the art that various changes in form and details may be made therein without departing from the spirit and scope of the present disclosure as defined by the appended claims.

Therefore, preferred embodiments should be considered in descriptive sense only and not for purposes of limitation. The scope of the present disclosure is defined not by the detailed description of the present disclosure but by the appended claims, and all differences within the scope will be construed as being included in the present disclosure.

INDUSTRIAL APPLICABILITY

A predictive diagnostic device according to the present disclosure is applicable to not only monitoring systems but also general photographing systems.

The invention claimed is:

1. A predictive diagnostic device comprising:
    a controller configured to periodically predict a future breakdown date of at least one component of a surveillance camera according to characteristic information on the component of the surveillance camera and information on an operation environment of the surveillance camera; and
    a warning unit configured to provide a warning when the future breakdown date is within a predetermined time period from a current date
    wherein the controller is further configured to:
        refer to data of a predicted breakdown rate with respect to a cumulative usage period of the component and determine a date when the predicted breakdown rate is equal to a threshold breakdown rate to be the future breakdown date, and
        change the future breakdown date due to an increase in the predicted breakdown rate after the current date, according to the information on the operation environment and the characteristic information on the component of the surveillance camera.

2. The predictive diagnostic device of claim 1, further comprising:
    a communication interface configured to receive the characteristic information on the component of the surveillance camera, the information on the operation environment of the surveillance camera, and a moving picture from the surveillance camera and provide the characteristic information, the information on the operation environment, and the moving picture to the controller;
    an information storage configured to store the characteristic information, the information on the operation environment, and the moving picture received from the controller and provide the stored characteristic information, the stored information on the operation environment, and the stored moving picture to the controller;
    a user input interface configured to input camera control signals of a security person to the controller; and
    a display configured to display the moving picture received from the controller.

3. A monitoring system comprising a surveillance camera and a monitoring device,
    wherein the surveillance camera is configured to transmit information on its own operation environment to the monitoring device, and
    wherein the monitoring device is configured to periodically predict a future breakdown date of at least one component of the surveillance camera according to the information on the operation environment and characteristic information of the component of the surveillance camera and provide a warning when the predicted future breakdown date is within a predetermined time period from a current date,
    wherein the monitoring device is further configured to:
        refer to data of a predicted breakdown rate with respect to a cumulative usage period of the component and determine a date when the predicted breakdown rate is equal to a threshold breakdown rate to be the future breakdown date, and change the future breakdown date due to an increase in the predicted breakdown rate after the current date, according to the information on the operation environment and the characteristic information on the component of the surveillance camera.

4. A monitoring system comprising:

at least one surveillance camera; and a monitoring device configured to display a live-view moving picture from the surveillance camera and control an operation of the surveillance camera according to input signals of a security person, wherein the surveillance camera is configured to transmit information on its own operation environment to the monitoring device, wherein the monitoring device is configured to periodically predict a future breakdown date of a component of the surveillance camera according to the information on the operation environment of the surveillance camera and characteristic information on the component of the surveillance camera, and provide a warning when the future breakdown date is within a predetermined time period from a current date, and wherein the monitoring device is further configured to:
refer to data of a predicted breakdown rate with respect to a cumulative usage period of the component and determine a date when the predicted breakdown rate is equal to a threshold breakdown rate to be the future breakdown date, and change the future breakdown date due to an increase in the predicted breakdown rate after the current date, according to the information on the operation environment and the characteristic information on the component of the surveillance camera.

5. The monitoring system of claim 4, wherein the characteristic information of the component of the surveillance camera is transmitted from a component operating server included in a manufacturing company of the surveillance camera.

6. The monitoring system of claim 4, wherein, when the future breakdown date is within the predetermined time period from the current date, the monitoring device is further configured to display and notify a model name of a surveillance camera including a warning-target component, the model name of the warning-target component, and a time period from the current date to the future breakdown date, and the notification is made to a mobile terminal of at least one of a maintenance person, an installer, and the security person.

7. The monitoring system of claim 4, wherein the information on the operation environment comprises:

temperature information from a temperature sensor included in the surveillance camera;

rate information on an applied voltage with respect to a rated voltage of the each surveillance camera;

humidity information from a humidity sensor included in the each surveillance camera;

vibration information from a gyro sensor included in the each surveillance camera;

information on a cumulative panning time period;

information on a cumulative tilting time period; and information on a cumulative zooming time period.

8. The monitoring system of claim 4, wherein the surveillance camera comprises first through third cameras installed at an identical location, wherein the monitoring device is further configured to regularly perform a diagnosis mode of the first through third cameras, and wherein after the monitoring device in the diagnosis mode controls the first through third cameras to photograph an identical target area at an identical viewing angle, the monitoring device in the diagnosis mode is further configured to obtain photographing information on each of the first through third cameras, compare pieces of photographing information on the first through third cameras with one another, and determine whether each of the first through third cameras is abnormal, according to a result of the comparison.

9. The monitoring system of claim 4, wherein the surveillance camera comprises first through fourth cameras installed at an identical location, wherein the monitoring device is further configured to control the first camera to regularly perform a diagnosis mode of the second through fourth cameras, and wherein the monitoring device in the diagnosis mode is configured to:

control the first camera to perform panning, tilting, and zooming and photograph an identical target area at an identical viewing angle to the second camera, and then obtain first difference information by comparing photographing information on the first camera with photographing information on the second camera, control the first camera to perform panning, tilting, and zooming and photograph an identical target area at an identical viewing angle to the third camera, and then obtain second difference information by comparing the photographing information on the first camera with photographing information on the third camera, control the first camera to perform panning, tilting, and zooming and photograph an identical target area at an identical viewing angle to the fourth camera, and then obtain third difference information by comparing the photographing information on the first camera with photographing information on the fourth camera, and determine whether each of the second through fourth cameras is abnormal, according to a result of a comparison between the first through third difference information.

10. The monitoring system of claim 9, wherein the first difference information is difference information indicating a difference between a subject distance from the first camera and a subject distance from the second camera, wherein the second difference information is difference information indicating a difference between a subject distance from the first camera and a subject distance from the third camera, wherein the third difference information is difference information indicating a difference between the subject distance from the first camera and a subject distance from the fourth camera, and wherein it is determined whether a zoom lens or focus lens of each of the second through fourth cameras has been moved from a given location, according to a result of a comparison between the first through third difference information.

11. The monitoring system of claim 9, wherein the first difference information comprises:

difference information indicating a difference between a subject distance from the first camera and a subject distance from the second camera, difference information indicating a difference between auto-focus data at the first camera and auto-focus data at the second camera, wherein the second difference information comprises:
difference information indicating a difference between the subject distance from the first camera and a subject distance from the third camera, and
difference information indicating a difference between the auto-focus data at the first camera and auto-focus data at the third camera, wherein the third difference information comprises:
difference information indicating a difference between the subject distance from the first camera and a subject distance from the fourth camera, and
difference information indicating a difference between the auto-focus data at the first camera and auto-focus data at the fourth camera, and wherein it is determined whether a zoom lens or focus lens of each of the second through fourth cameras has been moved from a given location, according to a result of a comparison between the first through third difference information.

12. The monitoring system of claim 9, wherein the first difference information is difference information indicating a difference between auto-exposure data at the first camera and auto-focus data at the second camera, wherein the second difference information is difference information indicating a difference between the auto-exposure data at the first camera and auto-focus data at the third camera, wherein the third difference information is difference information indicating a difference between the auto-exposure data at the first camera and auto-focus data at the fourth camera, and wherein it is determined whether an infrared cut-off filter of each of the second through fourth cameras is abnormal, according to a result of a comparison between the first through third difference information.

13. The monitoring system of claim 9, wherein the first difference information comprises:
difference information indicating a difference between auto-exposure data at the first camera and auto-exposure data at the second camera, and
difference information indicating a difference between automatic white-balance data at the first camera and automatic white-balance data at the second camera, wherein the second difference information comprises:
difference information indicating a difference between the auto-exposure data at the first camera and auto-exposure data at the third camera, and
difference information indicating a difference between the automatic white-balance data at the first camera and automatic white-balance data at the third camera, wherein the third difference information comprises:
difference information indicating a difference between the auto-exposure data at the first camera and auto-exposure data at the fourth camera, and
difference information indicating a difference between the automatic white-balance data at the first camera and automatic white-balance data at the fourth camera, and wherein it is determined whether an infrared cut-off filter of each of the second through fourth cameras is abnormal, according to a result of a comparison between the first through third difference information.

14. A monitoring system comprising:
surveillance cameras installed in at least a first surveillance area and a second surveillance area;
a monitoring device of the first surveillance area configured to display live-view moving pictures from the surveillance cameras installed in the first surveillance area and control an operation of each of the surveillance cameras installed in the first surveillance area according to input signals of a security person of the first surveillance area;
a monitoring device of the second surveillance area configured to display live-view moving pictures from the surveillance cameras installed in the second surveillance area and control an operation of each of the surveillance cameras installed in the second surveillance area according to input signals of a security person of the second surveillance area; and
a predictive diagnostic server,
wherein information on an operation environment of each of the surveillance cameras in the first surveillance area is transmitted to the predictive diagnostic server via the monitoring device of the first surveillance area,
wherein information on an operation environment of each of the surveillance cameras in the second surveillance area is transmitted to the predictive diagnostic server via the monitoring device of the second surveillance area,
wherein the predictive diagnostic server is configured to periodically predict a future breakdown date of each component of each of the surveillance cameras according to the information on the operation environment of each of the surveillance cameras and characteristic information on the component of each of the surveillance cameras, and provide a warning when the future breakdown date is within a predetermined time period from a current date, and
wherein the monitoring device is further configured to:
refer to data of a predicted breakdown rate with respect to a cumulative usage period of the component and determine a date when the predicted breakdown rate is equal to a threshold breakdown rate to be the future breakdown date, and
change the future breakdown date due to an increase in the predicted breakdown rate after the current date, according to the information on the operation environment and the characteristic information on the component of the surveillance camera.

* * * * *